I. ELLIS.
Safety-Harness.
No. 131,747.  Patented Oct. 1, 1872.
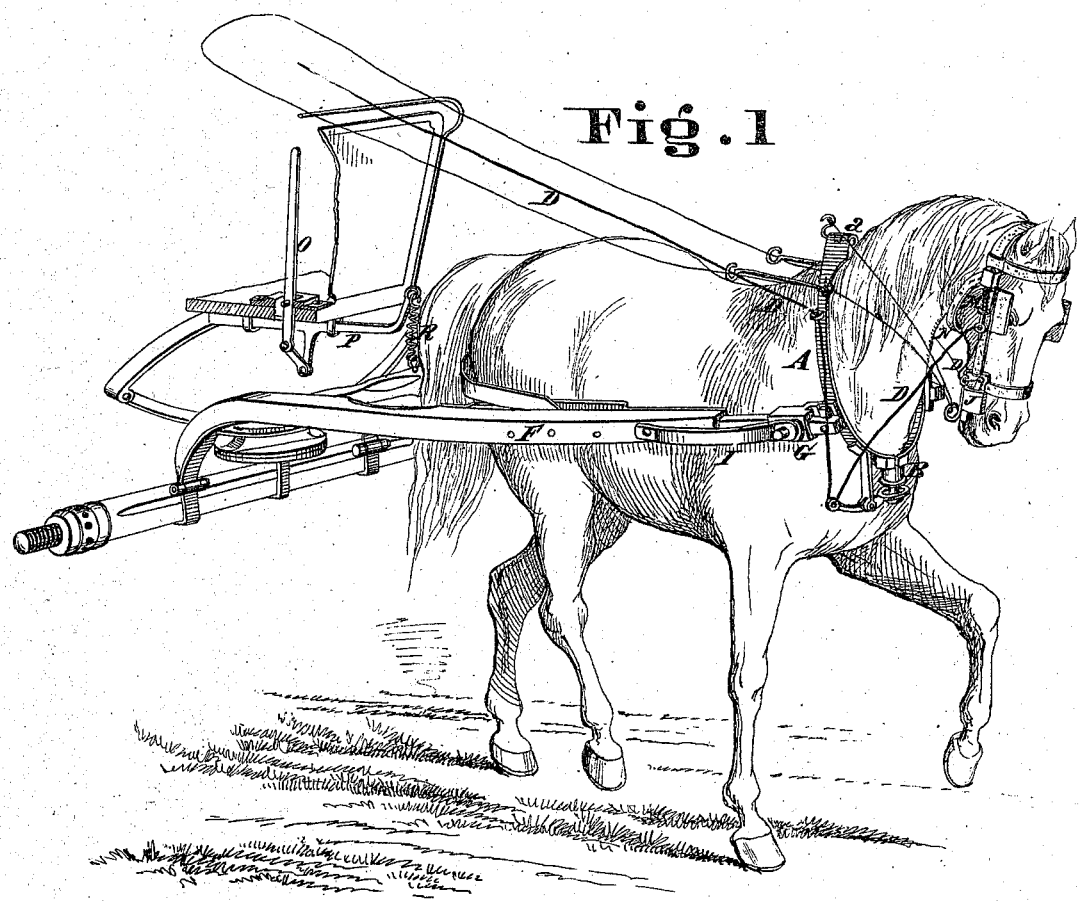
Fig. 1
Fig. 2
Fig. 3
Fig. 4
Fig. 5
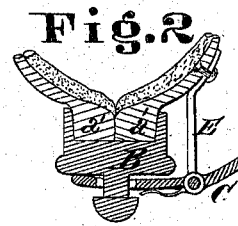
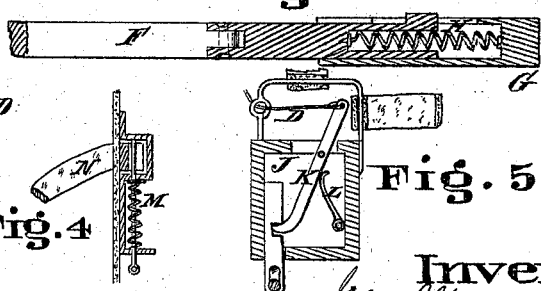

UNITED STATES PATENT OFFICE.

IRA ELLIS, OF TYLER, TEXAS.

IMPROVEMENT IN SAFETY-HARNESS.

Specification forming part of Letters Patent No. 131,747, dated October 1, 1872; antedated September 28, 1872.

*To all whom it may concern:*

Be it known that I, IRA ELLIS, of Tyler, Smith county, State of Texas, have invented certain new and useful Improvements in Harness for the Attachment of Horses to Carriages, of which the following is a specification:

Nature and Objects of Invention.

My invention relates to the class of harness which are designed to enable the detachment of the horse therefrom instantaneously, and also give an elastic connection between the horse and carriage. My invention consists, first, in the provision of a collar for the horse, the sides of which are hinged together at the top, and so connected at the bottom as to admit of ready disconnection, to permit of the passage of the horse through the collar; second, in a peculiar device for detaching the bridle from the horse by a detachment of the bit from the mouth and the throat-strap from one side of the bridle; third, in an elastic connecting device between the collar and shafts of the carriage of a peculiar construction.

Description of the Accompanying Drawing.

Figure 1 is a perspective view of a part of a carriage with horse attached. Fig. 2 is a section of the device for securing the detachable ends of the collar together. Fig. 3 illustrates in section the device for connecting the collar with the shafts of the carriage. Fig. 4 exhibits the device for detachably securing the throat-strap. Fig. 5 is a section of the device for detachably securing the bit to the bridle.

General Description.

A is the collar. Its sides are connected together at the top by hinge $a$, and are arranged to open sufficiently at the bottom to permit the horse when freed to pass entirely through between them. The sides are connected together at the bottom, when the horse is properly harnessed, by means of socket B, which fits over the two half-circle ends $a'$ $a'$ of the collar and holds them together. The socket is operated to release the collar by means of lever C and cord D, the latter running back into the driver's hand or for attachment to any part of the carriage. The lever C is pivoted to the bracket E of the collar. The collar A is connected to the shafts F by the sliding-bar G and springs H I, the latter serving to permit the connection to yield when the horse pulls, and thus prevent sudden shocks liable to injure the horse. The spring I is a common flat one, and is adapted to spring inward when there is strain upon it. One side of the bridle has a box, J, in which a spring-catch, K L, operates to hold the connecting-link of one end of the bit. When the rope or cord, D, is pulled the catch is so far moved as to release one end of the bit, and it falls from the horse's mouth. At the same time the cord D releases a catch, M, which holds one end of the throat-strap N, and thus the bridle is entirely detached from the horse's head. When the horse is about to be detached it is necessary to support the shafts of the carriage, and for this purpose I have provided the lever O pivoted to the bottom of the vehicle, slide P, and spring R, the latter being connected between the end of the lever and one of the shafts. A movement of the lever in such a way as to extend the spring will cause the entire weight of the shafts to rest upon the spring, and the horse can leave the vehicle without the shafts being allowed to fall on his legs.

With this entire device the harness can be wholly detached from the horse, when necessary, in a moment of time and with a single pull of a cord. Parts of my invention may, however, be used independent of the other parts, as, for instance, the detachable collar may be used with other devices for disconnecting the bridle.

Claims.

1. The collar A, when the sides thereof are hinged together at the top, and its ends $a'$ connected by socket-lever B C, as and for the purpose specified.

2. In combination with the shafts F and collar A, the slide G and springs H I, connected and operating substantially as described, and for the purpose specified.

3. The bridle of the harness, when its bit is connected at one end by spring-catch K L, and the throat-strap by spring-catch M, operating as described, and for the purpose specified.

In testimony of which invention I hereunto set my hand.

IRA ELLIS.

Witnesses:
FRANK MILLWARD,
J. L. WARTMANN.